Oct. 2, 1951 P. F. M. GLOESS ET AL 2,569,927

BINARY CODING BY SUCCESSIVE SUBTRACTIONS

Filed Nov. 1, 1949 3 Sheets-Sheet 1

INVENTORS
PAUL FRANCOIS MARIE GLOESS
LOUIS JOSEPH LIBOIS
By: Haseltine, Lake & Co.
AGENTS

BINARY CODING BY SUCCESSIVE SUBTRACTIONS

Filed Nov. 1, 1949 3 Sheets-Sheet 2

INVENTORS
PAUL FRANCOIS MARIE GLOESS
LOUIS JOSEPH LIBOIS
By: Hazeltine, Lake & Co.
AGENTS Oct. 2, 1951 P. F. M. GLOESS ET AL 2,569,927

BINARY CODING BY SUCCESSIVE SUBTRACTIONS

Filed Nov. 1, 1949 3 Sheets-Sheet 3

INVENTORS
PAUL FRANCOIS MARIE GLOESS
LOUIS JOSEPH LIBOIS
By: Haseltine, Lake & Co.
AGENTS Patented Oct. 2, 1951

2,569,927

UNITED STATES PATENT OFFICE 2,569,927

BINARY CODING BY SUCCESSIVE SUBTRACTIONS

Paul François Marie Gloess and Louis Joseph Libois, Paris, France

Application November 1, 1949, Serial No. 124,771
In France November 13, 1948

6 Claims. (Cl. 332—1)

The present invention relates to a coding system which transforms originally amplitude modulated pulses into groups of code pulses.

In previously known type of coders transforming originally amplitude modulate pulses into groups of code pulses, the amplitude of the signal to be coded is successively compared with the amplitudes of a number of reference signals. According to whether the amplitude of the signal to be coded or of a substractive residue deduced from said signal is larger or smaller than the amplitude of the reference signal a corresponding code pulse is created or not and, in the first case, the reference signal is subtracted from the signal to be coded or from its residue.

In these coders, the amplitude of the reference signal varies from one code element to the next according to powers of 2.

In such coders, more specifically, the amplitude A of the signal to be coded is compared with the amplitude R of a reference signal. If $A>R$, a code pulse is produced corresponding to the first element of the group of code pulses; then $(A-R)$ is determined and is compared with the new reference signal $$\frac{R}{2}$$

If $A<R$, no code pulse is produced and the first element of the group of code pulses is a zero element, then A is compared, without subtracting R as previously, with the new reference signal $$\frac{R}{2}$$

and so on.

In order to allow this coding process to be performed, the amplitude of the signal to be coded is stored by some appropriate agency, such as the charge of a condenser, during the whole time necessary to the successive comparisons.

On the contrary a characteristic feature of the coder which is the object of the present invention is that it dispenses with the necessity of a storing, its operation being based on the rapid and repeated circulation of the signal to be coded or of successive modifications of it through said coder.

According to a further characteristic feature of the coder, the object of the invention, the amplitude of the reference signals is the same for all code elements, the amplitude modulated pulse to be coded or of its substractive residue being amplified by a factor of two after each stage of the coding process.

To this effect, during the first stage of the coding process, the coder according to the invention compares the amplitude A of the pulse to be coded with the amplitude R of a reference signal. If $A>R$ it generates a code pulse corresponding to the first element of the group of code pulses, then it effects the subtraction $(A-R)$ and the multiplication $2(A-R)$. It is this latter amplitude which, during the time interval corresponding to the second stage of the coding process, is compared with the same reference signal of an amplitude R. If $A<R$, the coder does not generate any code pulse and the first element of the group of code pulses is a zero element, then it effects the multiplication 2A. It is this latter amplitude which, during the time interval corresponding to the second stage of the coding process is compared with the same reference signal of amplitude R.

According to another feature of the invention, the coder comprises an electric chain, consisting of an electronic two-stage comparator, made up of two stages with their inputs and outputs respectively in parallel.

A first stage, hereafter called "threshold and subtraction amplifier" which passes the signal applied to its input only if its amplitude is larger than the threshold amplitude (R) and modifies it by subtraction and multiplication, for instance into $2(A-R)$ in the case of an applied signal of amplitude A and which, at the same time emits a code pulse. During the operation of this first stage the second stage, hereafter described, is rendered inoperative or "blocked."

A second stage, acting as a shunt to the first one and hereafter designated as a "by-pass amplifier," which passes the signal applied to its input without altering its amplitude if its is lower than the threshold (R) of the above-mentioned first stage.

The device according to the invention further comprises a delay line whose input is fed from the output of above-said comparator and delaying signals applied to its input by a time interval equal to the duration of a code pulse (or "code element"), followed by an auxiliary amplifier having for instance, an amplification factor of two, or "doubler," the output of which reapplies the thus treated signals to be input of the aforesaid two-stage comparator.

According to another feature of the invention, the coder comprises a second delay line having its input fed from the amplitude-modulated pulses applied to the input of the comparator and delaying said pulses by a time interval equal to the duration of emission of a complete code group increased by an elementary interval equal to the duration of one code element, and an amplifier hereinafter called blocking amplifier, amplifying said delayed pulses to such a level that, combined with the signals applied to the input of the doubler, it gives negative blocking signals for the stages of the electronic comparator.

The invention will now be described with reference both to a general diagram and to a particular example of embodiment. The description will be given with reference to the appended drawings wherein.

Figure 1:
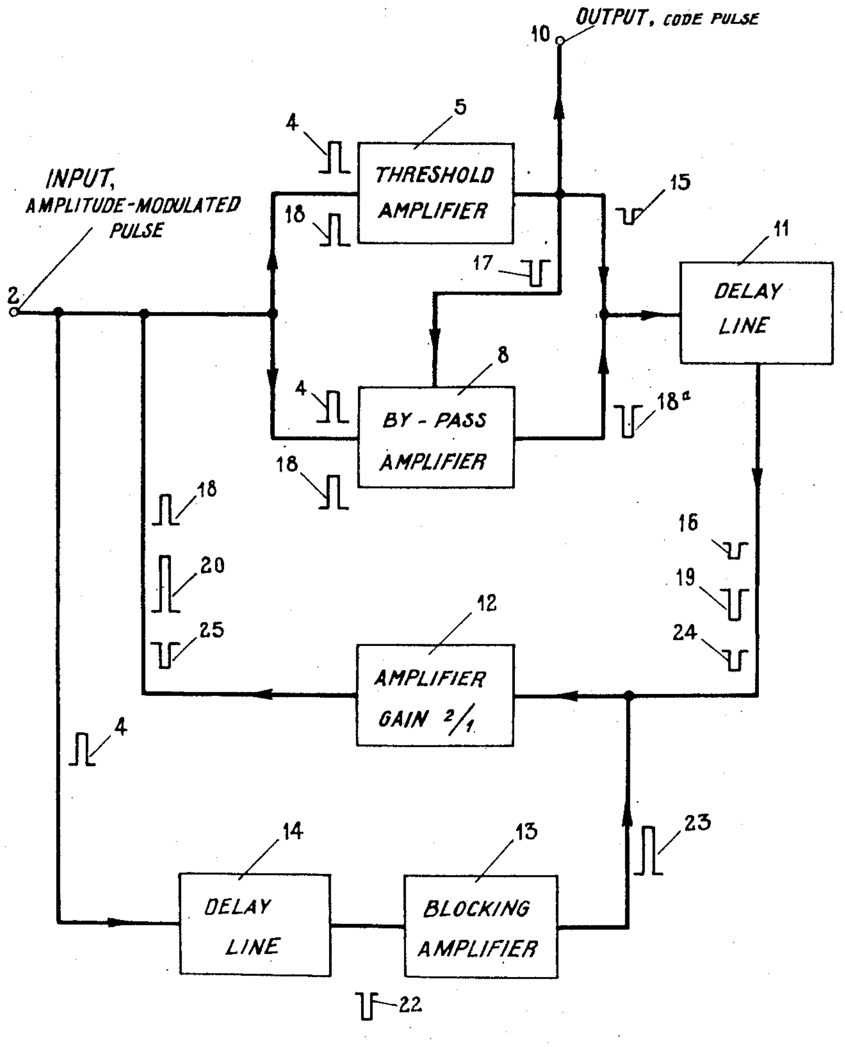
Figure 1 shows the general electrical diagram of the coder of the invention.
Figure 2:
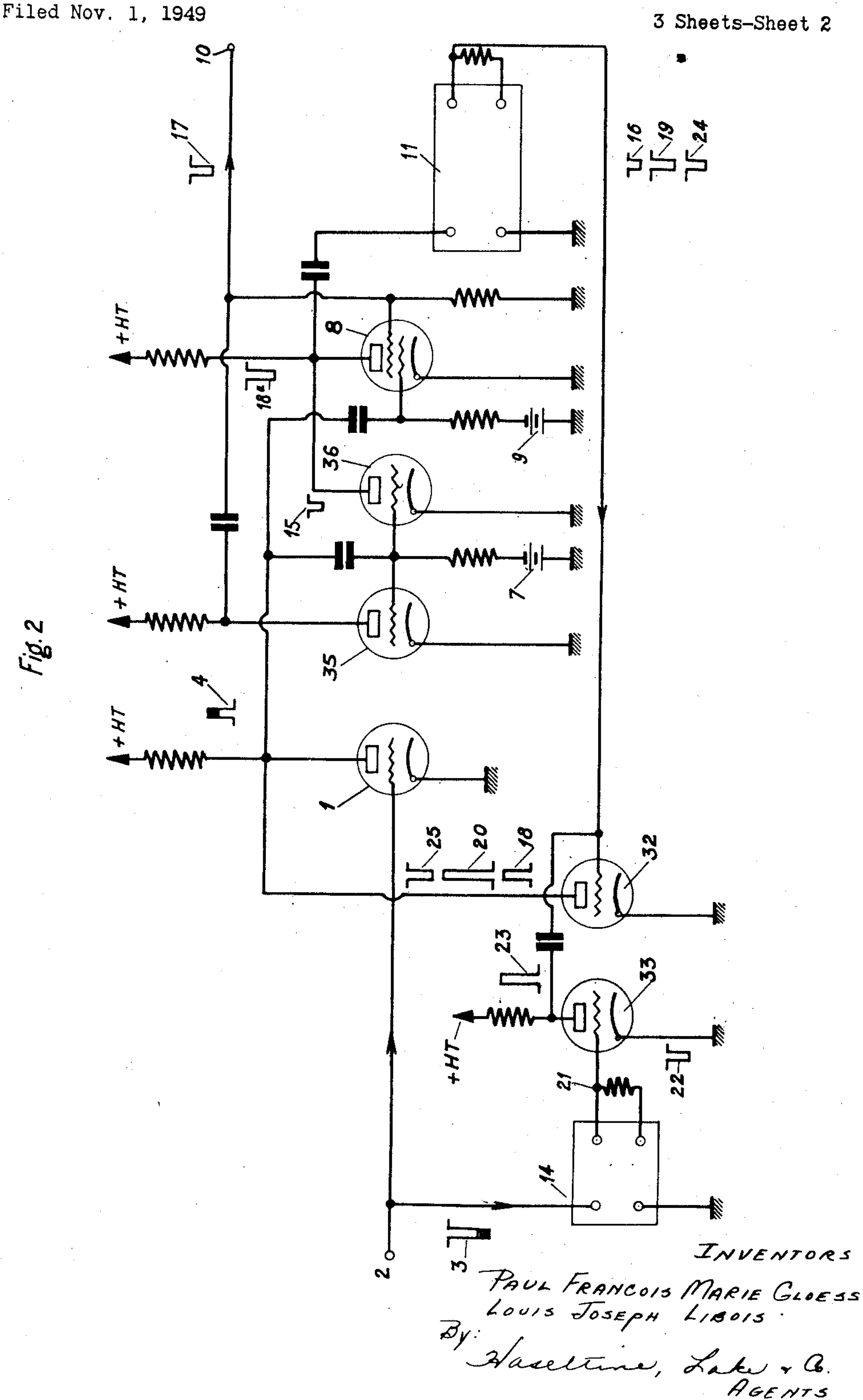
Figure 2 shows a particular example of embodiment of a coding device in accordance with the invention.

Figure 1 shows the block diagram of the coder; the reference numerals therein are the same as for the particular embodiment of Figure 2. The amplitude modulated pulses are, after eventual inversion and amplification, by stages not shown, applied in parallel to the inputs of a threshold amplifier 5 and a by-pass amplifier 8, each of which has a gain equal to unity. The threshold value is constant and equal to half of the maximum value of the amplitude which the modulated pulse can assume. If the level of the modulated pulse is higher than the threshold of the stage 5, the latter delivers, on one hand, towards 10, a code pulse, on the other hand, towards 8 a blocking pulse, and finally towards the delay line 11 a pulse whose amplitude is equal to that of the incoming pulse decreased by the threshold value. If the level of the modulated pulse is lower than the threshold of the stage 5, the latter remains blocked and the amplifier 8, which does not receive any blocking pulses, delivers towards the delay line 11 a pulse whose amplitude is equal to that of the incoming pulse. The pulse from the delay line 11, whose delay time equals the elementary interval between two code pulses, is applied to the amplifier stage 12 which doubles its amplitude. The pulse from 12 is re-introduced at the input to the comparator 5—8, a code pulse arising as many times as there are elements in the code selected.

The delay line 14 and the blocking amplifier 13 act to limit the operation of the coding system to the number of operations necessary, i. e. to the number of code elements. The original modulated pulse is thus delayed by a time equal to $n$ times the elementary interval separating two codes pulses $n$ being the number of elements in the code selected, the delay line 14 having a delay time equal to the duration of $n$ code elements, and amplified at 13 in such a manner that the pulse from 13, combined with the pulse feeding into the amplifier 12, gives, at the output of this amplifier a negative blocking pulse for the comparator. The latter is then ready for receiving a new original modulated pulse.

Figure 2 shows an example of embodiment of a coder according to the block of Figure 1. The operation of the coder of Figure 2 will be explained in connection with the pulse diagrams of Figure 3 which give, at various points of the electrical chain the shapes and relative positions of the pulses. The pulses are aligned on lines whose reference numeral reproduces the point of the electrical chain of Figure 2 where they are produced; the same references are shown on Figure 1.

A first tube 1 receives on its grid, through the input terminal 2, negative pulses 3, modulated in amplitude, and positive pulses appear, in consequence, in its anode circuit such as represented at 4.

The pulses 4 are applied, on one hand, to the grids of two tubes 35 and 36, negatively biased by the battery 7, and on the other hand to a first grid of a tube 8, negatively biased by the battery 9.

The anode circuit of tube 35 is connected, on one hand, to an output terminal 10 and, on the other hand, to a second grid of tube 8.

The anodes of tubes 36 and 8 are connected in parallel, and their circuit leads to the input to a delay line 11 whose output acts on the grid of a tube 32. This grid is also connected to the anode circuit of a tube 33 whose grid is supplied with the pulse 3, after being delayed in line 14.

The anode of the tube 32 is connected with the anode of the tube 1.

The level $h$ of the pulse 4 can vary between zero and a maximum value A which corresponds, for instance, to 128 times the elementary codification level (7-element binary code).

It will be assumed here that $h$ has a value slightly higher than $A/2$. The bias source 7 of tubes 35 and 36 is adjusted so as to determine for these tubes a conductivity threshold, precisely for a level $A/2$ applied to the grids, with the result that in the case foreseen, the pulse 4 will give rise to an anode current in these two tubes whose value is a function of the level $h-A/2$.

The gain of the tube 36 will be assumed equal to unity, and there will then appear in its anode circuit a negative pulse 15 with a level equal to $h-A/2$.

This pulse 15 goes through the delay line 11, before reaching the grid of the tube 32. The transmission time of the line 11 is made equal to $\theta$, which is equal to the time interval between one code element and the next.

Figure 3:
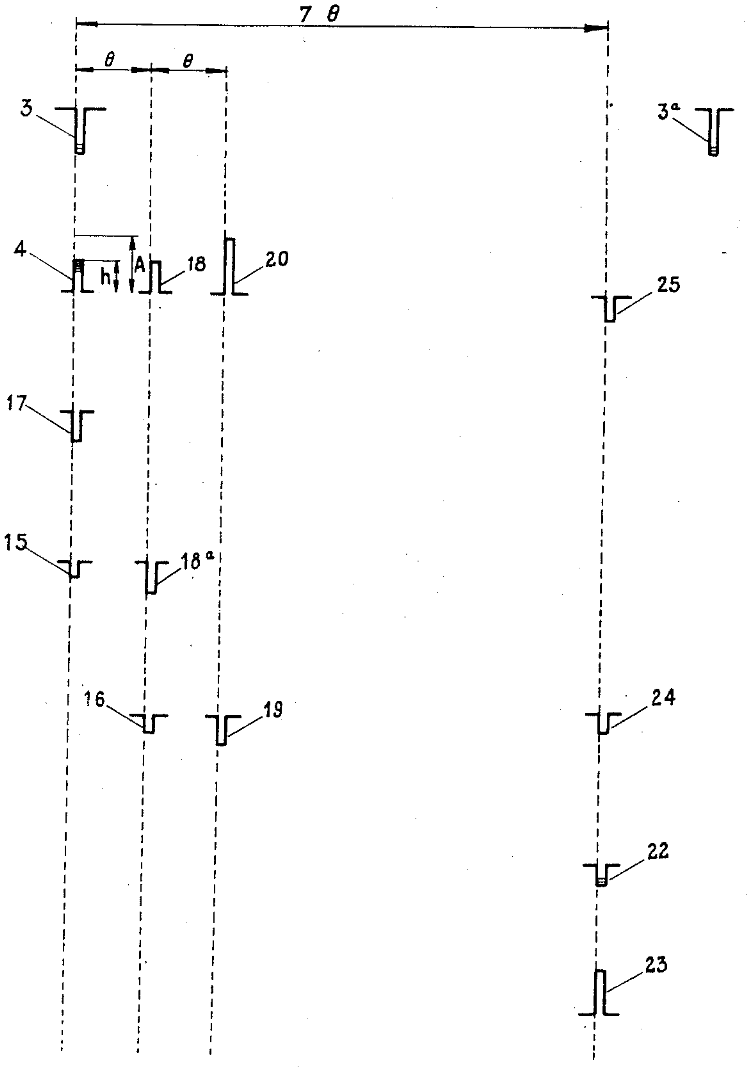
Figure 3 shows the shapes of the various pulses at certain points indicated on the electrical diagrams of Figures 1 and 2.

The pulse thus applied to this grid is shown at 16 (Figure 3).

The tube 35, which operates simultaneously with the tube 36 generates a negative pulse 17 which, correctly shaped and clipped by circuits not shown and connected with the terminal 10, will become a code pulse.

Further, the pulse 17 is applied to the second grid of the tube 8, while the first grid of said tube receives the pulse 4. Due to this fact, the tube 8 remains blocked in spite of the signal 4 and only the pulse 15 from the tube 36 reaches the line 11 and, after a delay $\theta$, reaches the grid of the tube 12 with the above calculated level $h-A/2$.

As will be seen later, the tube 33 still remains inactive and may be ignored provisionally.

The gain of tube 32 is adjusted so as to amplify the incoming signal by a factor of 2; there will thus be found, at a time $\theta$, after the pulse 4, of a value $h$, a pulse 18 with a value $2h-A$, applied to the grids of the tubes 35, 36 and 8.

It will now be assumed that the level $2h-A$ of pulse 18 is lower than the threshold value $A/2$ and consequently the anode currents of the tubes 35 and 36 will remain zero, the pulse corresponding to the pulse 17 of the previous case will be absent, as well as the corresponding code pulse, and nothing will cause the blocking of the tube 8. This tube, whose bias voltage 9 causes the appearance of the anode current to coincide with the base of pulse 18 (previously 4), is also adjusted to transmit to line 11 the pulse 18, preserving its value $2h-A$ and only reversing its polarity which becomes negative, or 18ª. The pulse thus applied to the grid of tube 12 at instant $2\theta$, is shown at 19 on Figure 3 and, after amplification and inversion, by the tube 32, gives the signal 20, with a value $4h-2A$ which comes back to the grids of the tubes 35, 36 and 8.

According to whether the value of this signal is higher or lower than the threshold $A/2$ of tubes 35 and 36, one is again in the first case considered (signal 4) or in the second case (signal 18).

Each time a code pulse is obtained from a pulse such as 17, appearing at 10, Figure 2, and this as many times as there are elements in the code selected, the delay line 14 and the tube 33 acting to limit the operation of the coding system to the number of operations necessary, for instance 7 in the case already considered of a 7-element binary code.

To this effect, the delay of line 14 will be taken equal to $7\theta$, and after this time, after the appearance of the pulse 3 at the input 2 to the system, there will appear at 21, at the output from line 14, a negative pulse 22 which will give rise to the positive pulse 23 in the anode circuit of the tube 33, which pulse will be applied to the grid of the tube 32, at the same time as a signal 24 such as 16, from line 11. The circuits will be adjusted for the resulting signal to be always positive, the signal 25, generated in the anode circuit of the tube 12 will then always be negative and will be blocked by the grids of the tubes 35, 36 and 8, the whole of the circuit being then ready for coding a new pulse 3ª applied at 2.

It might be objected that in the case of an incoming signal 3 with a zero or a very low value, the pulse 23 would be inexistent or, at any rate, too weak to neutralize the pulse 24. To obviate this drawback, it is sufficient to limit the depth of modulation of the pulse 3 so as never to drop below a given minimum of the absolute value of the amplitude, or to add a fixed pulse to the modulated pulse 3. The coding capacity of the system would not thus be altered provided this modification thus effected in the characteristics of the pulse 3. and therefore, also, of the pulse 4, is taken into account in the adjustment of the bias 7 and 9 of the tubes 35, 36 and 8.

Secondary circuits can be added to the described system, for example for giving a greater precision to the codification operation.

The batteries 7 and 9 may be replaced by cathode biasing circuits, or by resistances. The same resistances or other means can be arranged so as to improve the linearity of the characteristics mainly for the tubes 1, 36, 8 and 32.

Generally, one will select, for the tubes 1, 35, 36, 32 and 33, pentode tubes, while the tube 8 may be a pentagrid tube, the grids shown for this tube on Figure 2 being respectively signal and modulation grids.

For greater clearness in the diagrams of Figure 3, the incoming pulses 3, together with the various pulses derived have been represented with durations much smaller than $\theta$. Actually, their duration can almost reach $\theta$.

It has also been assumed in the foregoing description that the code used is based on successive integer powers of two. Actually a different base number might be selected, provided it be larger than unity and that the related amplification factor be correspondingly altered.

We claim:

1. Method for translating recurrent amplitude-modulated electric pulses into code pulse groups, according to a chosen code, each code group including an integer number $n$ of successive elements, which comprises comparing the amplitude of said amplitude-modulated pulses with a fixed reference amplitude, dividing said amplitude-modulated pulses into a first group of greater amplitude than said reference amplitude and a second group of amplitude at most equal to said reference amplitude, deriving from said amplitude-modulated pulses modified signals selectively by reducing the amplitude of the pulses of said first group by an amount equal to said reference amplitude and thereafter amplifying the reduced amplitude by a factor greater than unity and leaving the pulses of said second group unaltered and thereafter amplifying them by said factor greater than unity, creating a code pulse for said first group, repeating on the modified signals the same sequence of comparing, dividing, deriving and creating, thus deriving from said modified signals further modified signals which are thereafter submitted to the same sequence of operations as said modified signals and repeating the same procedure in all a number of times determined by the number $n$ of the elements of above-said chosen code, a code pulse being created for the first group of pulses obtained as a result of each successive comparison and the total number of comparisons being equal to above-said integer number $n$.

2. Method according to claim 1, including staggering the produced code pulses in time in a predetermined order and with predetermined time intervals.

3. Method according to claim 1, wherein the constant multiplication numerical factor multiplying the amplitude of the amplitude-modulated pulses or modified signals after each comparison is equal to two.

4. A device for translating recurrent amplitude-modulated electric pulses into code pulse groups, comprising a comparator for comparing the amplitude of said amplitude-modulated pulses with a fixed reference amplitude, said comparator comprising a threshold amplifier transmitting only signals exceeding a threshold reference amplitude while diminishing their amplitude by an amount equal to said reference amplitude and a by-pass amplifier having an input and an output connected respectively in parallel with the input and output of said threshold amplifier, means for impressing amplitude-modulated pulses upon the inputs of both said threshold and by-pass amplifier, a first delay line having its input fed from the outputs of said threshold and by-pass amplifier, an auxiliary amplifier with an amplification factor greater than unity having its input fed from the output of said first delay line and its output feeding the inputs of both above-said threshold and by-pass amplifiers, a second delay line having a delay time greater than that of said first delay line and having its input connected in parallel with the inputs of said threshold and by-pass amplifiers, a blocking amplifier having its input fed from the output of said second delay line and delivering to above-said auxiliary amplifier blocking signals rendering said auxiliary amplifier inoperative during time intervals corresponding to the duration of said blocking signals, and means controlled from the output of said threshold amplifier for transmitting a code pulse each time a signal applied to the input of said threshold amplifier exceeds the above-said reference amplitude.

5. A translating device according to claim 4, wherein the first delay line has a delay time substantially equal to the duration of one code signal and the second delay line has a delay time substantially equal to the duration of a code pulse group.

6. A translating device according to claim 4, wherein the auxiliary amplifier has an amplification factor equal to two.

PAUL FRANÇOIS MARIE GLOESS.
LOUIS JOSEPH LIBOIS.

REFERENCES CITED

The following references are of record in the file of this patent:

UNITED STATES PATENTS

| Number | Name | Date |
| --- | --- | --- |
| 2,437,707 | Pierce | Mar. 16, 1948 |